Nov. 7, 1967
R. A. SHUART
3,351,763
PHOTOELECTRIC CLOUD COVER AND
OPACITY MEASURING EQUIPMENT
Filed Jan. 27, 1965
2 Sheets-Sheet 1
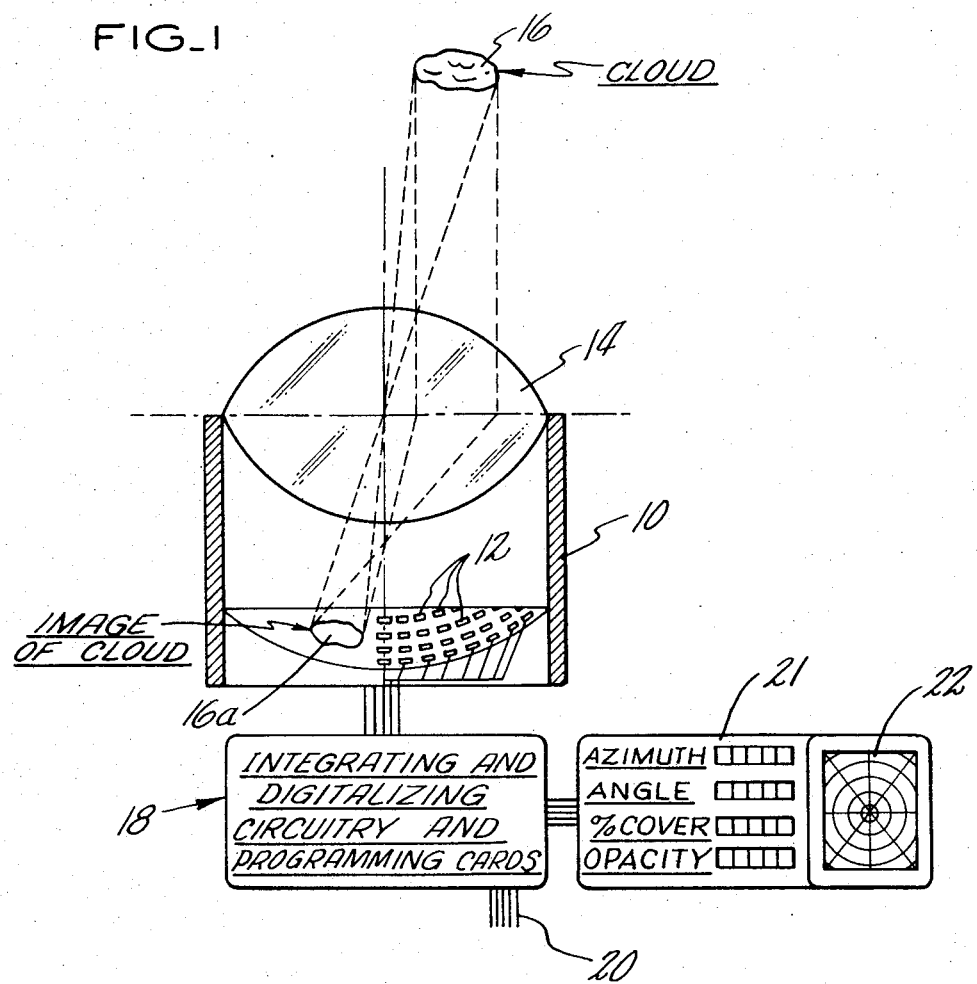
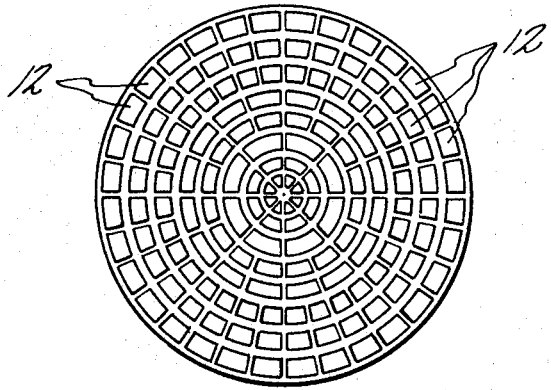
INVENTOR
RODNEY A. SHUART
BY *M. B. Tacker*
ATTORNEY Nov. 7, 1967       R. A. SHUART                3,351,763
                PHOTOELECTRIC CLOUD COVER AND
Filed Jan. 27, 1965   OPACITY MEASURING EQUIPMENT      2 Sheets-Sheet 2

INVENTOR
RODNEY A. SHUART
BY M. B. Tasker
ATTORNEY

United States Patent Office 3,351,763
Patented Nov. 7, 1967

3,351,763
PHOTOELECTRIC CLOUD COVER AND OPACITY MEASURING EQUIPMENT
Rodney A. Shuart, Wapping, Conn., assignor to United Aircraft Corporation, East Hartford, Conn., a corporation of Delaware
Filed Jan. 27, 1965, Ser. No. 428,366
10 Claims. (Cl. 250—209)

This invention relates to apparatus for the measurement and display of cloud cover and cloud location within the entire horizon-to-horizon sky canopy as visible from a single location on the ground.

With the advent of the space age it has become desirable to be able to monitor the meteorological conditions of a given sky area as visible from a single point on the ground so that such information as the percentage cloud cover throughout the entire sky, the percentage cloud cover within a specified sector of the sky and the locations of distinct clouds in the sky can be obtained and introduced into a meteorological data collection system.

Briefly, the present invention provides such a monitoring system. A single lens or lens system which subtends a wide angle field of view is placed to have an unobstructed view of the visible sky. An image of the entire sky and any clouds present are focused upon a surface composed of a number of energy-sensitive cells arranged in annular and radial rows within a supporting structure. Each cell or group of cells is identified with a specific area in the sky and the voltage generated by each cell as a result of energy received from that area provides a measure of the presence or absence of clouds in the specific area. By integrating the voltages generated by the cells, a measure of total energy received from the entire sky is provided and consequently a measure of cloud cover is obtained. The integration of cell voltages is performed according to the location of the signals with respect to specific areas of the sky to determine cloud cover only, and according to the signal intensity to determine opacity of cloud cover combined with percentage coverage.

It is accordingly an object of this invention to provide a monitoring system as above described.

A further object of this invention is to provide circuitry for processing cell voltages which will range in number from a discrete signal from each individual cell or a limited number of cells for identification and location of separate and discrete clouds, to a single integrated signal from all cells. In addition this circuitry will provide for separate integrations of presence or absence of clouds and for combined presence and opacity.

A still further object of this invention is to provide means for monitoring and displaying azimuth and angle data for cover and opacity for a specific location in the sky or for a specific sector of the sky or for the entire visible sky.

Another object of the present invention is generally to improve apparatus for the collection and display of meteorological data.

These and other objects and advantages of the apparatus of this invention will become evident or will be specifically pointed out in connection with the following detailed description of the invention as illustrated in the accompanying drawings. In these drawings:

FIG. 1 is a somewhat diagrammatic showing illustrating the invention, the housing containing the lens and the cellular surface being shown in vertical cross section;

FIG. 2 is a plan view of the curvilinear cellular surface;

Figure 3:
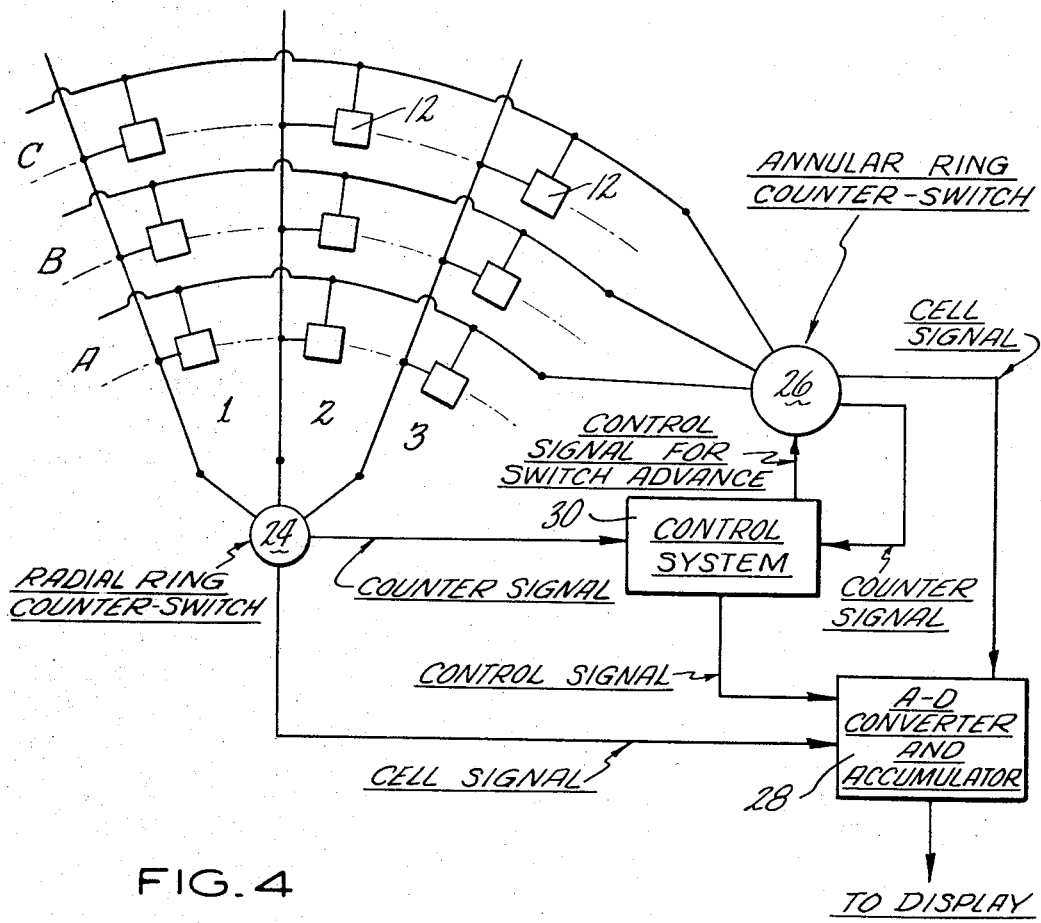
FIG. 3 is a diagrammatic showing of one form of processing circuitry which may be used to produce the desired integration of the cell voltages.

FIG. 1 shows schematically the apparatus of the invention. In this figure, 10 is a housing which provides a supporting enclosure for the curvilinear surface made up of a plurality of cells 12 and for the lens 14 which focuses the image of the entire visible sky canopy on the cellular surface. For purposes of illustration the device is shown under conditions in which the entire sky canopy, horizon-to-horizon, is clear of cloud cover except for a single, small cloud 16 the image 16a of which is shown focused on the cellular surface by lens 14. It will be evident that under this sky condition that output voltage of only those cells 12 which are affected by the cloud image 16a will differ from the voltage generated by remaining cells caused by background energy received from the remainder of the sky. The strength of the voltage signal produced by the affected cells will vary with the density of degree of opacity of the cloud 16.

Housing 10 is a rigid cylindrical member capable of supporting the lens and the cellular surface in accurate alignment and is completely opaque to prevent entrance of spurious signals from the sky, i.e. any signal which has not entered the housing through lens 14.

The curvilinear surface on which the image of the sky is focused is designed to be compatible with the lens system used.

The surface may be flat but a curvilinear surface will permit improved focusing of an image of the sky canopy and will provide increased area over a planar surface and thus an increased number of energy-sensitive cells for a given diameter of housing 10. The surface is located within the housing so that the image of the sky is focused thereon, the location being determined by the focal length of lens 14. The cells 12 are arranged on the surface in annular and radial rows, as best indicated in FIG. 2. The individual cells can thus be identified with azimuth and angle so that the voltage output of each cell can be identified in digital format according to sky sector. Various types of cell can be used. For example, photo-sensitive cells can be used to obtain data during daylight while infra-red cells can be used to obtain data during both daylight and dark operation. The single lens shown is suitable for some purposes. Multiple lens systems, such as one for each of the four quadrants of the sky, may be desirable for increased accuracy and reduced aberration.

The circuitry 18 for integrating and digitalizing signals, under the control of programming cards, is capable of integrating voltages from all or from a limited number of cells 12. The integration is performed according to the location of the voltage signals to determine cloud cover only, and according to location of the signals and their intensity to determine opacity of cloud cover combined with percentage coverage. This processing circuitry 18 also provides output 20 to a meteorological data collection system, not shown in detail.

The programs used to command the integrating and digitalizing circuitry 18 provide for outputs which range from a signal from each cell or a limited number of cells to identify and locate discrete clouds to an integrated signal from all cells. In addition it will provide for separate integrations of presence or absence of clouds and for combined presence and opacity signals, or signal strength.

Means is also provided to furnish a display suitable for continuous viewing which is fed from the integrating and digitalizing circuitry 18. To this end a monitoring display 21 is provided which has provision for indicating azimuth, angle, percent cover and opacity, as indicated in FIG. 1, as well as a picture 22 of the sky. This display presents azimuth and angle data for cover, and opacity for a specific location in the sky or for a specific sector of the sky or for the entire visible sky.

In FIG. 3 is shown diagrammatically one integrating and digitalizing circuitry which may be used for carrying out this phase of the invention, although any one of several other devices well known in the art may be used.

In FIGURE 3, cells 12 are depicted as squares which are connected to conductors leading to two ring counter-switches 24 and 26. Cells are arranged in annular rings designated by the letters A, B, C, . . . and radial rows designated by numbers 1, 2, 3, . . . . In operation, the annular ring counter-switch 26 would switch successively from ring A to ring B and continue through the $N^{th}$ ring of cells on command from the control system 30. When the annular ring counter-switch 26 is set on a specific lettered ring of cells, the radial counter-switch 24 is electronically swept through a 360° arc contacting each successive cell 12 in the lettered ring thus causing the output signal of each cell in the ring to be transmitted to an accumulator 28. At the completion of a sweep of the radial counter-switch through 360°, an additional switch position (not shown) is activated and an advance signal to the control system is relayed to the annular counter-switch which advances the annular switch 26 to the next annular ring, and the process is repeated. After the annular counter-switch 26 has completed all rings through the $N^{th}$ ring, an additional switch position (not shown) signals the control system of its completion, and the accumulator 28 is cleared, and the process repeated.

Figure 4:
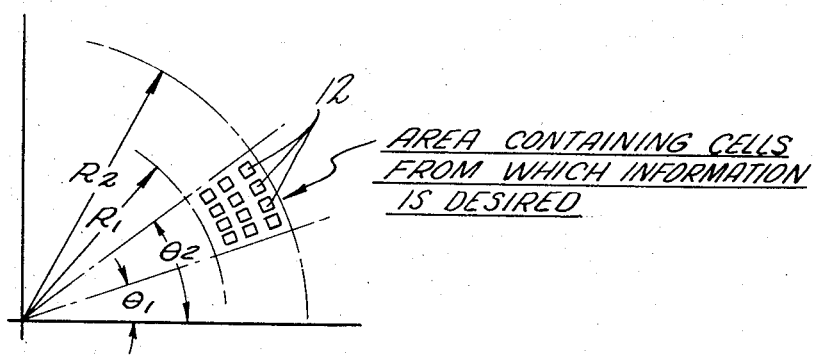
FIG. 4 is a detail view showing how cell voltages can be summed in areas bounded by upper and lower limits in polar coordinates.

The control system 30 performs the functions of (1) signaling the advance of counter-switches, (2) designating the specific cell voltages to be accumulated or combined, and (3) signaling the clearance of the data in the accumulator register. The first function of advancing counter-switches is a simple relay of a signal to the switch to be advanced. The second function of designating selective accumulation or integration requires the identification of cell signals according to their individual locations and related sky areas, and the transfer of control signals to the accumulator where summations are performed. The control system would contain logic circuits and programming instructions, conceivably in the form of printed circuit cards for the purpose of identifying cell voltages with areas of interest, such as the quadrants of the sky, to enable the desired summations of signals. Because the cells are arranged in a circular and radial pattern on the curvilinear surface, each cell position can be easily addressed by the use of polar coordinates R (radial distance) $\theta$ (angular position). As an example, the cloud cover in quadrants of the sky could be obtained by grouping signals in four areas, namely $\theta$ ranging from (1) 0° to 90°, (2) 90° to 180°, (3) 180° to 270°, and (4) 270° to 360° for all values of R in each of the four areas. As each cell signal is identified as being in one of the four quadrant regions, the control system 30 commands the accumulator 28 to sum each signal in the appropriate and separate register. R and $\theta$ cell positions required for the control system are supplied by the ring counter-switch positions as indicated in FIGURE 3. In the general case, cell voltages could be summed in any manner through the use of programming cards which signify areas bounded by upper and lower limits in polar coordinates which contain the cells. Thus the sum of all signals from an area bounded between $\theta_1$ to $\theta_2$ and $R_1$ and $R_2$ could be obtained (FIG. 4).

As shown in FIGURE 3, the control system 30 does not sense cell signals but only operates on the position signals of the counter-switches.

The third function of clearing the accumulator register is a simple relay of a signal from the annular counter-switch via the control system to the accumulator.

The A–D converter and accumulator 28 performs the functions of receiving and integrating cell signals, as directed by the control system 30, converting signals from analog to digital form, storing signal position information in the form of ring counter-switch data, and forwarding accumulated data to the indicator system. The accumulator is composed of storage registers and magnetic memory units. The storage registers, used for holding summations of cell signals, would be called up by the control system as required in accordance with the number of separate summations demanded by the programming cards in use at any particular time. Two separate summations would be performed at any one time, namely: (1) the presence of signals indicating cloud cover, and (2) the intensity of signals received to determine opacity. The registers would be cleared after each cycle and the values in the registers would be transferred to magnetic memory for display purposes until new and changed data is available in succeeding cycles. Analog signals would be used to drive a cathode ray tube for a visual display of cloud cover and would be located by positions data stored from the counter-switches. Analog signals would be converted to digital values for driving digital wheel displays showing azimuth, angle, percent cover, and opacity as appropriate.

It will be evident that, as a result of this invention, means has been provided for the measurement and display of cloud cover and cloud intensity within the entire horizon-to horizon sky canopy as visible from a single location on the ground. Further means has been provided for monitoring and displaying azimuth and angle data for cover and opacity for a specific location in the sky, for a specific sector of the sky or for the entire sky.

While only one embodiment of the invention has been shown and described it will be understood that various changes in the construction and arrangement of the parts may be made within the scope of the invention as defined by the appended claims.

I claim:

1. Apparatus for indicating cloud cover and cloud location within the horizon-to-horizon sky canopy from a single location on the ground comprising a surface on which the sky image is focused having a plurality of energy-sensitive cells arranged in a predetermined array on the surface, and focusing means comprising a lens means subtending a wide angle field of view of the sky canopy for focusing on said surface an image of the entire sky from horizon to horizon and any clouds that may be present in the sky.

2. Apparatus for continuously indicating the display of cloud cover and cloud location within the entire horizon-to-horizon sky canopy from a single location on the ground comprising focusing means including a lens means for focusing the image of the entire sky canopy, and a surface composed of energy-sensitive cells located on focal surface of said lens means, and means responsive to the voltages generated by the several cells for continuously indicating cloud cover and cloud location.

3. The apparatus of claim 2 in which the energy-responsive cells are arranged in radial and circular rows over the entire surface.

4. The apparatus of claim 2 in which the surface of the lens system is annular and concave and the energy-responsive cells are arranged in a predetermined pattern covering the entire surface.

5. The apparatus of claim 2 in which the image indicating surface is circular and is mounted in an opaque housing open at one end and a lens forms the closure for said housing opening.

6. The apparatus of claim 2 in which the image indicating surface comprises a plurality of energy-sensitive cells arranged generally in circular and radial rows and covering the entire surface.

7. Apparatus for continuously indicating the display of cloud cover and cloud location within the entire horizon-to-horizon sky canopy from a single location on the ground comprising a housing of opaque material having a circular opening, focusing means including a lens means forming a closure for said opening, a plurality of energy-sensitive cells in said housing forming a surface at the focal surface of said lens means, each cell being identified with a specific area in said sky canopy and each cell producing a voltage providing a measure of the presence or absence of cloud cover in one specific area of the sky.

8. Apparatus as claimed in claim 7 having means for integrating the voltages generated by said cells to produce an indication of total energy received from the entire sky from which a measure of the density of cloud cover is obtained.

9. Apparatus as claimed in claim 7 having means for integrating and digitalizing the voltages produced by said energy-sensitive cells, and means into which said integrated and digitalized voltages are fed for providing a continuous monitoring display of cloud cover.

10. Apparatus as claimed in claim 7 having means for integrating and digitalizing the voltages produced by said individual cells to produce output voltages for a meteorological data collection system.

References Cited
UNITED STATES PATENTS

| | | | |
|---|---|---|---|
| 2,903,204 | 9/1959 | Nyman et al. | 250—203 X |
| 3,152,257 | 10/1964 | Van Santen et al. | 250—209 |
| 3,278,752 | 10/1966 | Brixner | 250—210 |

ARCHIE R. BORCHELT, *Primary Examiner.*

J. D. WALL, *Assistant Examiner.*